(12) United States Patent
Kakizaki

(10) Patent No.: US 8,144,076 B2
(45) Date of Patent: *Mar. 27, 2012

(54) DISPLAY APPARATUS FOR DISPLAYING VIRTUAL IMAGE TO DRIVER

(75) Inventor: Masaru Kakizaki, Nagoya (JP)

(73) Assignee: DENSO CORPORATION, Kariya (JP)

( * ) Notice: Subject to any disclaimer, the term of this patent is extended or adjusted under 35 U.S.C. 154(b) by 902 days.

This patent is subject to a terminal disclaimer.

(21) Appl. No.: 12/222,326

(22) Filed: Aug. 7, 2008

(65) Prior Publication Data

US 2009/0073081 A1 Mar. 19, 2009

(30) Foreign Application Priority Data

Sep. 18, 2007 (JP) ................................. 2007-241134

(51) Int. Cl.
*G09G 5/00* (2006.01)
(52) U.S. Cl. ................. 345/7; 345/9; 340/435; 340/436
(58) Field of Classification Search ............... 345/1.1–9, 345/204–215; 340/435–440, 461, 901–903
See application file for complete search history.

(56) References Cited

U.S. PATENT DOCUMENTS

| | | | | |
|---|---|---|---|---|
| 5,801,667 A | * | 9/1998 | Shimizu et al. ................ | 345/7 |
| 6,327,536 B1 | | 12/2001 | Tsuji et al. | |
| 8,009,024 B2 | * | 8/2011 | Enya et al. ................ | 340/435 |
| 2005/0134479 A1 | * | 6/2005 | Isaji et al. ................ | 340/901 |
| 2005/0273263 A1 | * | 12/2005 | Egami et al. ................ | 701/301 |
| 2009/0189573 A1 | * | 7/2009 | Turchi et al. ................ | 323/234 |

FOREIGN PATENT DOCUMENTS

| | | |
|---|---|---|
| JP | A-H8-241493 | 9/1996 |
| JP | A-2004-364112 | 12/2004 |
| JP | A-2005-107916 | 4/2005 |

OTHER PUBLICATIONS

Journal of Society of Automotive Engineers of Japan , "HMI Transformed along with ITS Evolution", vol. 60, pp. 70-75 (2006) ( mentioned on p. 1 on the specification).

* cited by examiner

*Primary Examiner* — Vijay Shankar
(74) *Attorney, Agent, or Firm* — Posz Law Group, PLC

(57) ABSTRACT

A display apparatus has an image display unit that displays a virtual image by projecting an image light to a windshield, and an obstacle detector that detects an obstacle existing around the vehicle as well as a safety determination unit that determines safety of the vehicle relative to the detected obstacle based at least on one of a distance from the obstacle and a relative speed of the vehicle relative to the obstacle. The display apparatus also has an image control unit that controls a position of the virtual image to circle around the obstacle in a view of a driver when the obstacle is determined to be unsafe by the safety determination unit.

7 Claims, 8 Drawing Sheets

DISPLAY APPARATUS FOR DISPLAYING VIRTUAL IMAGE TO DRIVER

CROSS REFERENCE TO RELATED APPLICATION

The present application is based on and claims the benefit of priority of Japanese Patent Application No. 2007-241134 filed on Sep. 18, 2007, the disclosure of which is incorporated herein by reference.

FIELD OF THE INVENTION

The present disclosure generally relates to a display apparatus for clearly notifying a user of an obstacle such as a human, a vehicle or the like by using a headup display apparatus or the like.

BACKGROUND INFORMATION

Conventionally, an obstacle around a vehicle is notified for a driver of the vehicle by using a display system. For example, a night vision system uses a far-infrared ray camera disposed on the vehicle to detect a position and/or a movement of a detecting object that emits an infrared ray, and recognizes that the obstacle is existing on a road ahead of the vehicle, or crossing a road. Further, the night vision system determines whether or not the object is a walker based on a size and shape of the object. Then, an image of a vehicle front field is displayed on a display unit for notifying the driver of the vehicle of the walker on an expected travel route of the vehicle or of the walker crossing the street.

However, the above system displays the image of the detecting object on the display unit that is disposed on an instrument panel or the like, thereby making it difficult for the driver to watch the display unit due to a requirement of a move of a look of the driver away from a windshield to the display unit.

Therefore, a display system that projects an image light to be reflected on the windshield to generate in a vehicle front space a virtual image in a view of the driver for information notification is proposed. For example, when a walker 101 that causes unsafeness of the subject vehicle is seen through a windshield 17 as shown in FIG. 7, the proposed system such as the one described on page 73 of a non-patent document of Automotive Technology 2006 Vol. 60 No. 2 can display a frame image 105 as a virtual image for surrounding the walker 101 for the purpose of notifying the driver of a position of the unsafe obstacle.

However, due to the vibration of the vehicle during driving, the frame image 105 is also vibrated, thereby making the positions of the images 105a, 105b, 105c at times T, T+1, T+2 respectively different from each other in the view of the driver as shown in FIG. 8. The respectively different position of the image 105 annoys the driver of the vehicle in a great deal.

SUMMARY OF THE INVENTION

In view of the above and other problems, the present disclosure provides a display apparatus that displays a virtual image without letting a driver of a vehicle to recognizing a vibration of the image.

The display apparatus of the present disclosure uses an image display unit to display the virtual image in front of the vehicle, and the virtual image is controlled to circle around an obstacle on a path or an orbit in a view of the driver. Therefore, the position of the virtual image at a certain point of time is different from the position of the virtual image at a different point of time, thereby making it difficult for the driver to recognize the vibration of the virtual image. That is, the display unit of the present invention does not let the driver to recognize the vibration of the vehicle in the course of displaying the virtual image. Further, by controlling the position of the virtual image to move along an obit that surrounds the obstacle, the existence of the obstacle is clearly notified for the driver. Furthermore, the obstacle is marked by the virtual image that circles around the obstacle only after determining that the obstacle is unsafe for the driver. Therefore, the display apparatus prevents the driver from being annoyed by impartially displaying unnecessary virtual images for all of the detected objects that are not necessarily unsafe for the driver.

BRIEF DESCRIPTION OF THE DRAWINGS

Other objects, features and advantages of the present invention will become more apparent from the following detailed description made with reference to the accompanying drawings, in which.

DETAILED DESCRIPTION

An embodiment of the present invention is explained with reference to FIGS. 1, 4, 5.

1. Configuration of a Display Unit

Figure 1:
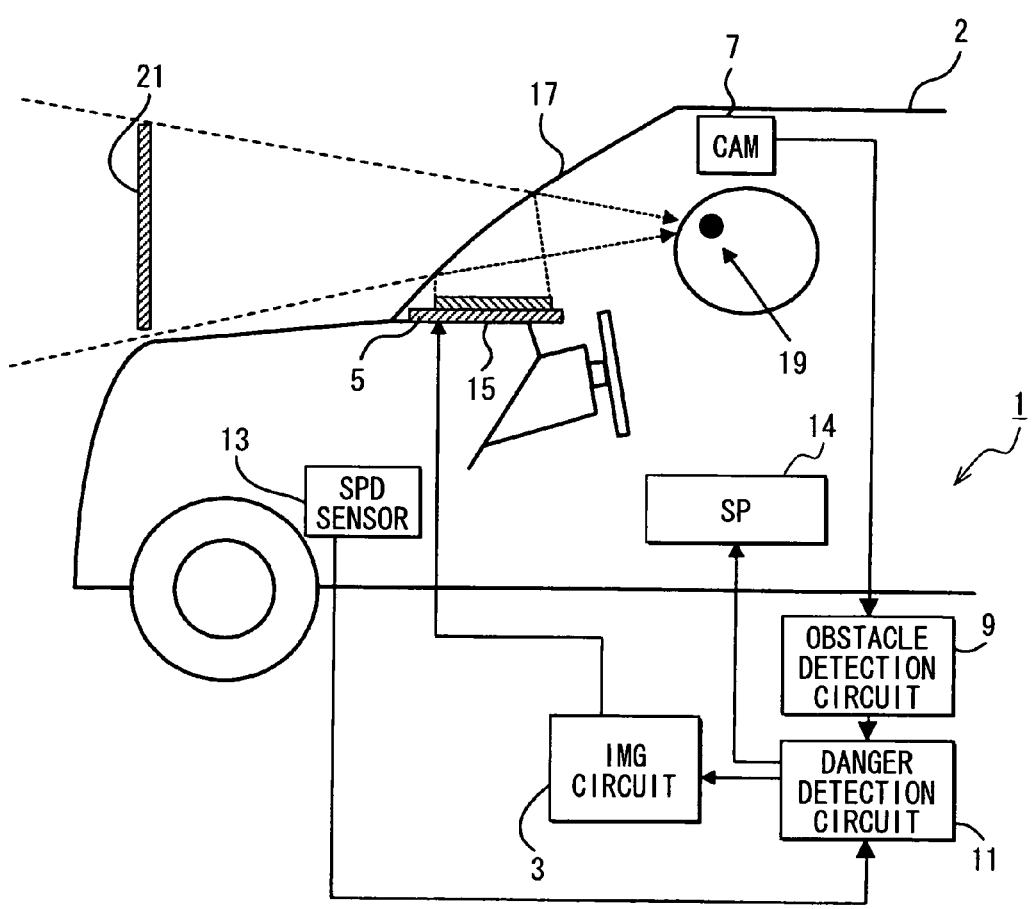
FIG. 1 is an illustration expressing a configuration of a display unit in an embodiment of the present invention.

A display unit 1 is a device disposed on a vehicle 2, and includes an image output circuit 3, a liquid crystal panel 5, a camera 7, an obstacle detection circuit 9, a danger detection circuit 11, a vehicle speed sensor 13 and a speaker 14 as shown in FIG. 1. The image output circuit 3 outputs image data on the liquid crystal panel 5. The liquid crystal panel 5 is disposed in an upper part of an instrumental panel 15, and displays an image output from the image output circuit 3. The light to display an image output from the liquid crystal panel 5 reflects on a windshield 17, and enters a viewpoint 19 of a driver. As a result, in a view of the driver, a virtual image 21 of an image displayed on the liquid crystal panel 5 is displayed in a space in front of the vehicle. The image output circuit 3 and the liquid crystal panel 5 can control a display position of the virtual image 21 so that the virtual image 21 moves sequentially over an orbit 27 surrounding an obstacle (e.g., another vehicle 23 in FIG. 4, a walker 25 in FIG. 5) in the circumference of the vehicle (e.g., in particular, in the front field of the vehicle) in a view of the driver as shown in FIGS. 4 and 5. In addition, a position, a size, and a shape of the orbit 27 vary depending on determination results of the danger detection circuit 11. The orbit 27 will be explained later in detail in the description.

The camera 7 is an imaging device to photograph a picture of a front field (designated as a "front picture" in the following) of the vehicle 2. The camera 7 is disposed inside of the vehicle 2 at a position that is close to the viewpoint 19 of the driver. The obstacle detection circuit 9 determines whether there is the obstacle (e.g., a walker or other vehicles) in the front picture photographed by the camera 7, and calculates an obstacle direction (i.e., a direction to the obstacle from the viewpoint 19), an obstacle distance (i.e., the distance to the obstacle from the vehicle 2) and the size of the obstacle when there is the obstacle in the front picture. The calculation can be performed by a well-known method from the shape, the movement and the brightness of the obstacle. The danger detection circuit 11 is a device to determine whether or not the obstacle recognized by the obstacle detection circuit 9 is unsafe. The method of how the unsafeness is determined is mentioned later. The vehicle speed sensor 13 detects a vehicle speed of the vehicle 2, and the result is output to the danger detection circuit 11. The speaker 14 is installed inside of the vehicle 2, and, depending on a determination result of the danger detection circuit 11, a beep sound is output therefrom.

2. The Processing Performed by the Display Unit

The processing performed by the display unit 1 is explained with reference to a flow chart in FIG. 2 and illustrations in FIGS. 3 to 6.

Figure 2:
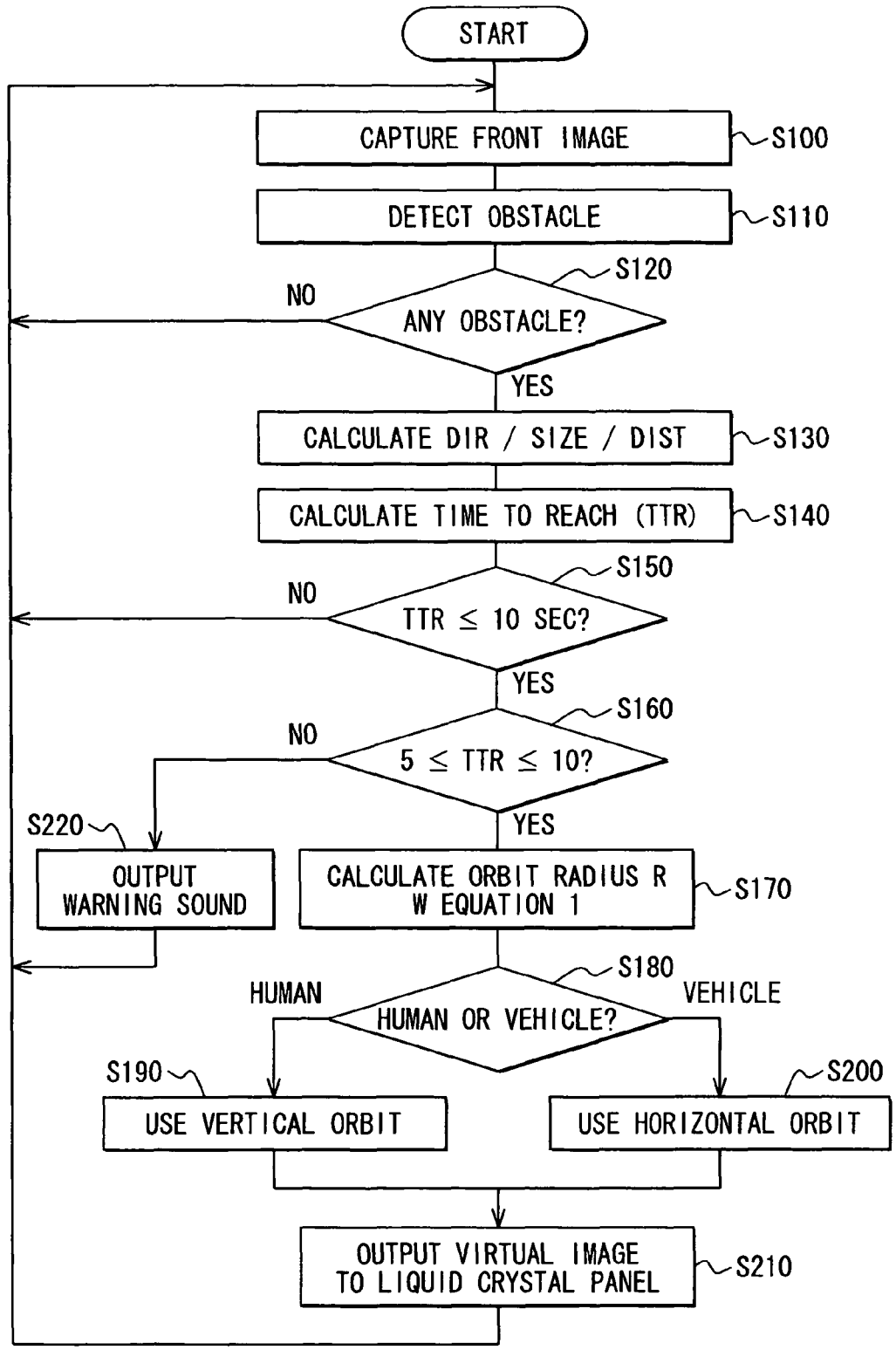
FIG. 2 is a flow chart expressing a processing performed in the display unit.

The processing in FIG. 2 is started when an engine of the vehicle 2 is started. In step S100, the front picture of the vehicle 2 is photographed by the camera 7.

In step S110, the obstacle detection circuit 9 extracts an obstacle from the front picture acquired in step S100. The extraction of the obstacle can be performed by using a well-known image recognition technology. For example, an element in the front picture can be extracted as an obstacle when the element is similar to the shape, size or other features of various obstacles (e.g., a walker, a vehicle or the like) memorized in advance.

Then, in step S120, whether an obstacle has been extracted from the front picture by the obstacle detection circuit 9 in step S110 is determined. When the obstacle has been extracted, the process proceeds to step S130. When no obstacle is extracted, the process returns to step S100.

In step S130, the obstacle direction (a direction to the obstacle seen from the viewpoint 19) of an extracted obstacle, the obstacle distance (the distance to the obstacle from the vehicle 2) and the size of the obstacle are calculated by the obstacle detection circuit 9.

Based on the vehicle speed of the vehicle 2 derived from the vehicle speed sensor 13 and the obstacle distance, a time-to-reach (TTR) for the vehicle 2 to reach the obstacle is calculated by the danger detection circuit 11 in step S140.

Then, in step S150, whether or not the calculated time-to-reach (TTR) is within a certain range (e.g., equal to or smaller than 10 seconds in this case) is determined by the danger detection circuit 11. In addition, whether or not the obstacle direction is within a certain scope (e.g., on a road) is determined in step S150.

When the time-to-reach (TTR) is determined to be equal to or smaller than 10 seconds and the obstacle is determined to be in the certain scope, the obstacle is determined as being unsafe, and the process proceeds to step S160. On the other hand, when the time-to-reach (TTR) is determined to be greater than 10 seconds or the obstacle is not in the certain scope, the process returns to step S100.

Then, in step S160, whether or not the time-to-reach (TTR) calculated in step S140 is within a predetermined range (e.g., 5 to 10 seconds in this case) is determined by the danger detection circuit 11. When TTR is within the predetermined range, the process proceeds to step S170. When TTR is not within the predetermined range, the process proceeds to step S220.

In step S170, a radius R of the orbit 27 of the virtual image 21 is determined by the danger detection circuit 11 based on an equation 1.

$$R = K \times (S/D) \quad \text{(Equation 1)}$$

In the above equation 1, K is a constant, S is a size of the obstacle in a unit of meter, and D is the obstacle distance in a unit of meter.

In step S180, it is determined by the danger detection circuit 11 whether the obstacle is a human or another vehicle. This determination can be conducted by using a well-known image recognition technology. For example, the shape, size, and other features are memorized in advance respectively for the human and vehicle, and the obstacle is determined as one of the human or the vehicle by the comparison of the shape, size, and other features. When the obstacle is determined as human, the process proceeds to step S190. When the obstacle is determined as the vehicle, the process proceeds to step S200.

In step S190, the shape of the orbit 27 is determined as a vertically elongated ellipse by the image output circuit 3. In step S200, the shape of the orbit 27 is determined as a horizontally elongated ellipse by the image output circuit 3.

In step S210, the image data is output to the liquid crystal panel 5 from the image output circuit 3. The virtual image displayed by the image data, that is, the virtual image 21 in a circular shape, moves on the orbit 27 arranged in a surrounding manner relative to the obstacle in a view of the driver as shown in FIG. 4 and FIG. 5 (e.g., the vehicle 23 in FIG. 4, the walker 25 in FIG. 5). The position, the radius R, and the shape (a vertically elongated ellipse/a horizontally elongated ellipse) of the orbit 27 in the image data are determined in the following manner.

Figure 3A:
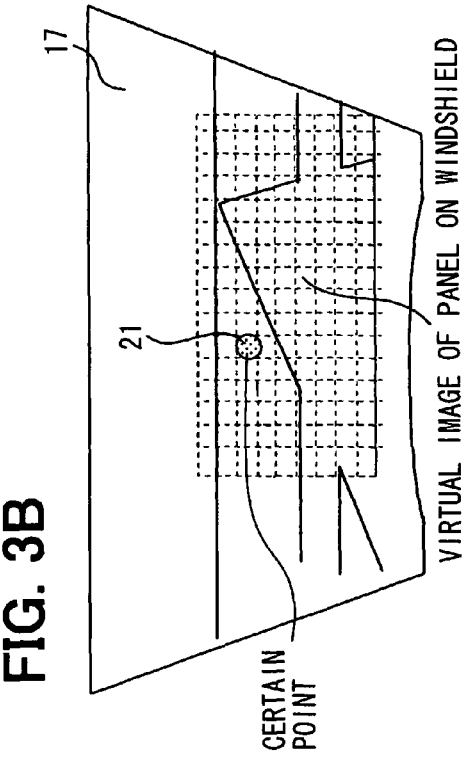
FIGS. 3A to 3D are illustrations expressing display coordinates of a liquid crystal panel, a virtually displayed liquid crystal panel on a windshield, a conversion table between obstacle directions and the display coordinates, and X and Y angles of the obstacle directions.
Figure 3B:
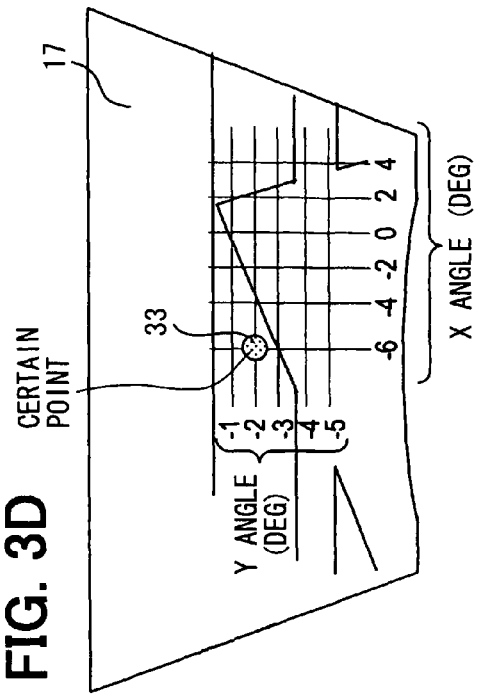
Figure 3C:
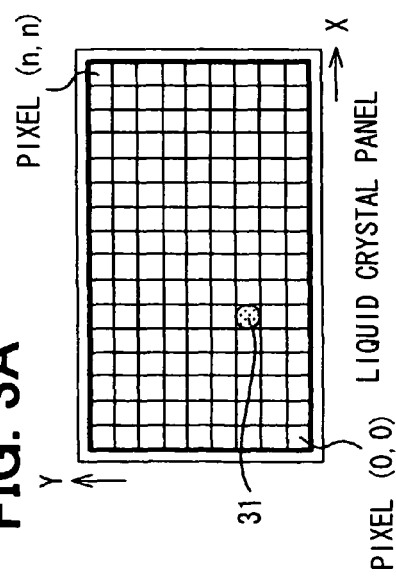
Figure 3D:
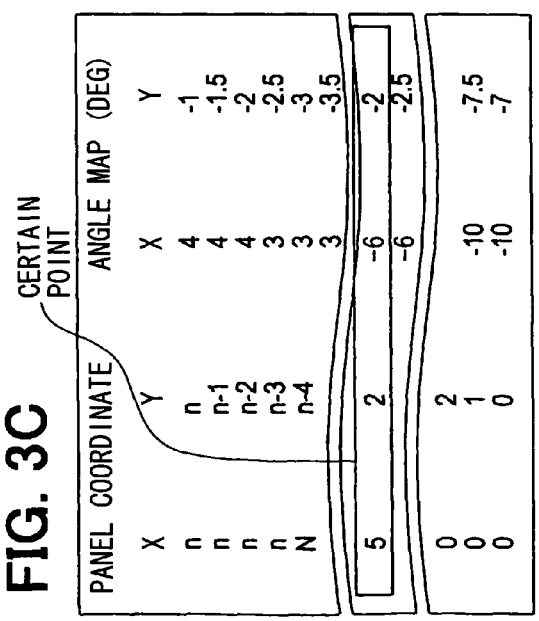

The direction of the obstacle is calculated by the obstacle detection circuit 9, as stated above, in step S130. The obstacle direction of an obstacle 33 is represented as a combination of X direction (a horizontal direction) and Y direction (a vertical direction) as shown in FIG. 3D. In a memory unit of the display unit 1 (not illustrated), a conversion table that converts the obstacle direction of the obstacle 33 calculated by the obstacle detection circuit 9 to display coordinates in the liquid crystal panel 5, as shown in FIG. 3C, is memorized. When a pixel 31 in the liquid crystal panel 5 is lit as shown in FIG. 3A according to the display coordinates converted by the conversion table, a virtual image 21 (in FIG. 3B) generated by the pixel 31 is positioned at a position of the obstacle 33 as shown in FIGS. 3B and 3D in a view of the driver.

The image output circuit 3 calculates, based on the obstacle direction calculated by the obstacle detection circuit 9 and the conversion table stated above, the display coordinates corresponding to the obstacle 33 in the liquid crystal panel 5, and the display coordinates are used as a center of the orbit 27. Further, the radius of the orbit 27 is set by using the radius R calculated in step S170. That is, the radius of the orbit 27 along the longer axis is set to the radius R, and the radius along the shorter axis is set to a value that is calculated by multiplying a fixed coefficient of, for example, 0.8 to the radius R.

Furthermore, the shape of the orbit 27 (a vertical ellipse/a horizontal ellipse) is set to the shape that is determined in step S190 or step S200. On the other hand, when the time-to-reach (TTR) is determined to be smaller than 5 seconds in step S160, the process proceeds to step S220, and a beep sound is output from the speaker 14.

3. The Advantageous Effects of the Display Unit

The display unit 1 provides the following effects.

Figure 4:
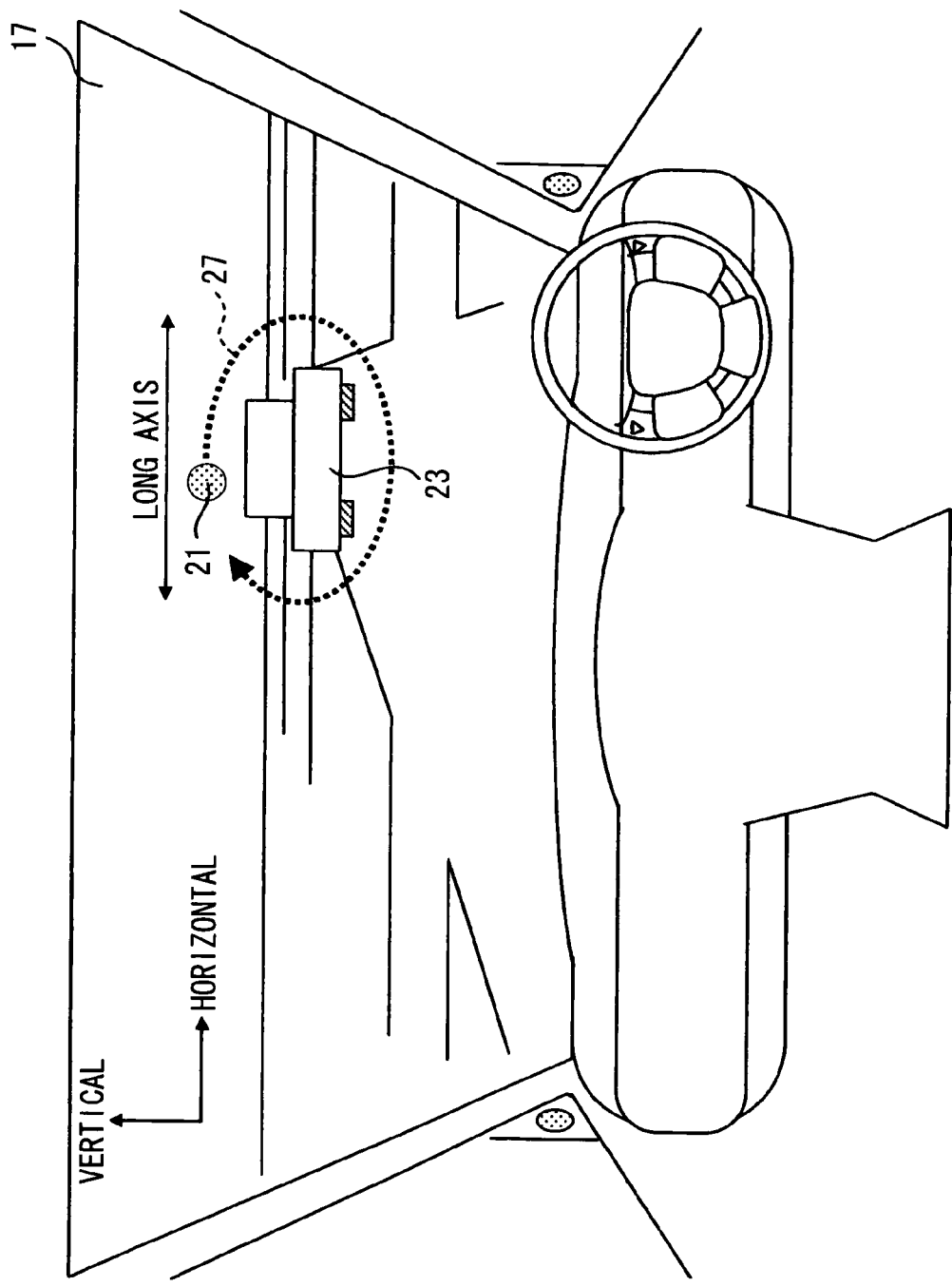
FIG. 4 is an illustration expressing a virtual image displayed by the display unit in a view of a driver looking a front field of the vehicle.
Figure 5:
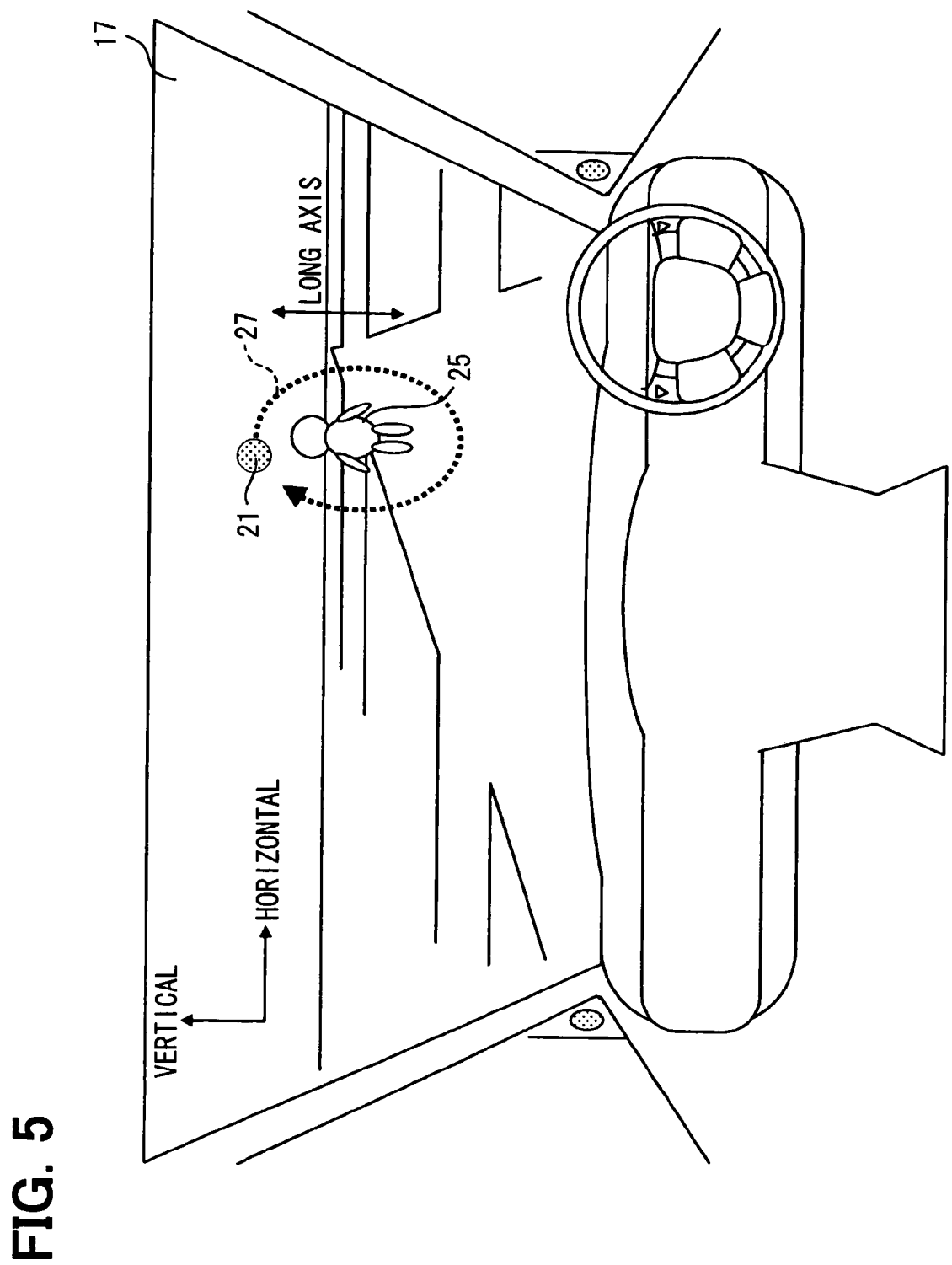
FIG. 5 is another illustration expressing a virtual image displayed by the display unit in a view of a driver looking a front field of the vehicle.

(i) The virtual image displayed by the display unit 1 is, as shown in FIGS. 4 and 5, the virtual image 21 partially occupying the orbit 27 and sequentially moving around the obstacle. In this case, the vibration of the virtual image 21 is hardly recognized by the driver because of the continuous movement of the virtual image 21, that is, because a position of the virtual image 21 at a certain point in time is different from a position of the virtual image 21 at a next point in time. For example, suppose that the virtual image 21 stands at the position as shown in FIG. 4 and FIG. 5 at a time t1, and the virtual image 21 circles around the orbit 27 to return to the same position at a time t2. Even if the position of the virtual image 21 at the time t2 is different from the position at the time t1 due to the vibration of the vehicle 2, the difference is hardly recognized by the driver because of the travel of the virtual image 21 away from the above position during the time between t1 and t2. In other words, the display unit 1 can display the virtual image without allowing the driver to recognize the vibration.

(ii) Because the display unit 1 displays an obstacle (e.g., the vehicle 23, the walker 25) as a virtual image, the display unit 1 allows a driver to easily recognize the obstacle in an intelligible manner.

(iii) The display unit 1 sets the radius of the orbit 27 to be small when the obstacle is small in size and when the obstacle is distant from the vehicle. Therefore, the display of the virtual image on the orbit 27 is provided in a fitting manner that naturally represents a sense of size and distance.

(iv) The display unit 1 uses different orbit shapes for the obstacle when the obstacle is human or when the obstacle is vehicle. That is, in other words, though the shape of the orbit 27 is a horizontally elongated oval in correspondence to the shape of the vehicle 23 as shown in FIG. 4, the shape of the orbit 27 is a vertically elongated oval in correspondence to the shape of the human 25 as shown in FIG. 5. As a result, even when the driver hardly distinguish in his/her direct view whether the obstacle is the vehicle 23 or the human 25, the obstacle can be instantaneously recognized as the vehicle 23 or the human 25 based on the shape of the orbit 27.

(v) When the display unit 1 determines whether or not an obstacle is dangerous, and a virtual image to move around an obstacle is displayed only when it is determined to be dangerous (step S150 in FIG. 2). Therefore, a virtual image is not displayed for the obstacle which is not dangerous, thereby preventing annoying feeling of the driver.

(vi) The display unit 1 only outputs the beep warning sound without displaying the virtual image circling around the obstacle when the time-to-reach (TTR) is very short, because there is no time for the driver to confirm the virtual image in that case. Therefore, the unsafe condition can be conveyed to the driver in an appropriate manner.

Although the present invention has been fully described in connection with the preferred embodiment thereof with reference to the accompanying drawings, it is to be noted that various changes and modifications will become apparent to those skilled in the art.

For example, the speed of the vehicle may be received from an engine ECU, or from other devices, instead of the speed sensor 13.

Further, the unsafeness of the obstacle may be determined by using a prediction of the movement of the obstacle in a later time based on the movement of the obstacle at the time of the determination.

Furthermore, though the obstacle is recognized by using the sensing machinery such as the camera 7 on the vehicle 2 in the above embodiment, positional information of the obstacle may be obtained by a method externally from outside of the vehicle 2, that is, from an infrastructure such as a vehicle-to-vehicle communication or the like, and the virtual image may be displayed based on the positional information from outside.

Furthermore, the extraction and the recognition of the obstacle may be performed by a laser radar, a millimeter wave radar, a stereo camera, or by a combination of these sensors, instead of using the camera 7.

Furthermore, the TTR (i.e., 10 seconds and 5 seconds) used in steps S150 and S160 in FIG. 2 may be changed to other values. That is, the TTR may be determined based on the time to stop according to the speed of the vehicle 2, or may be determined based on the time to travel a certain distance (e.g., a distance 'too far to watch' for the driver) such as 200 meters.

Figure 6:
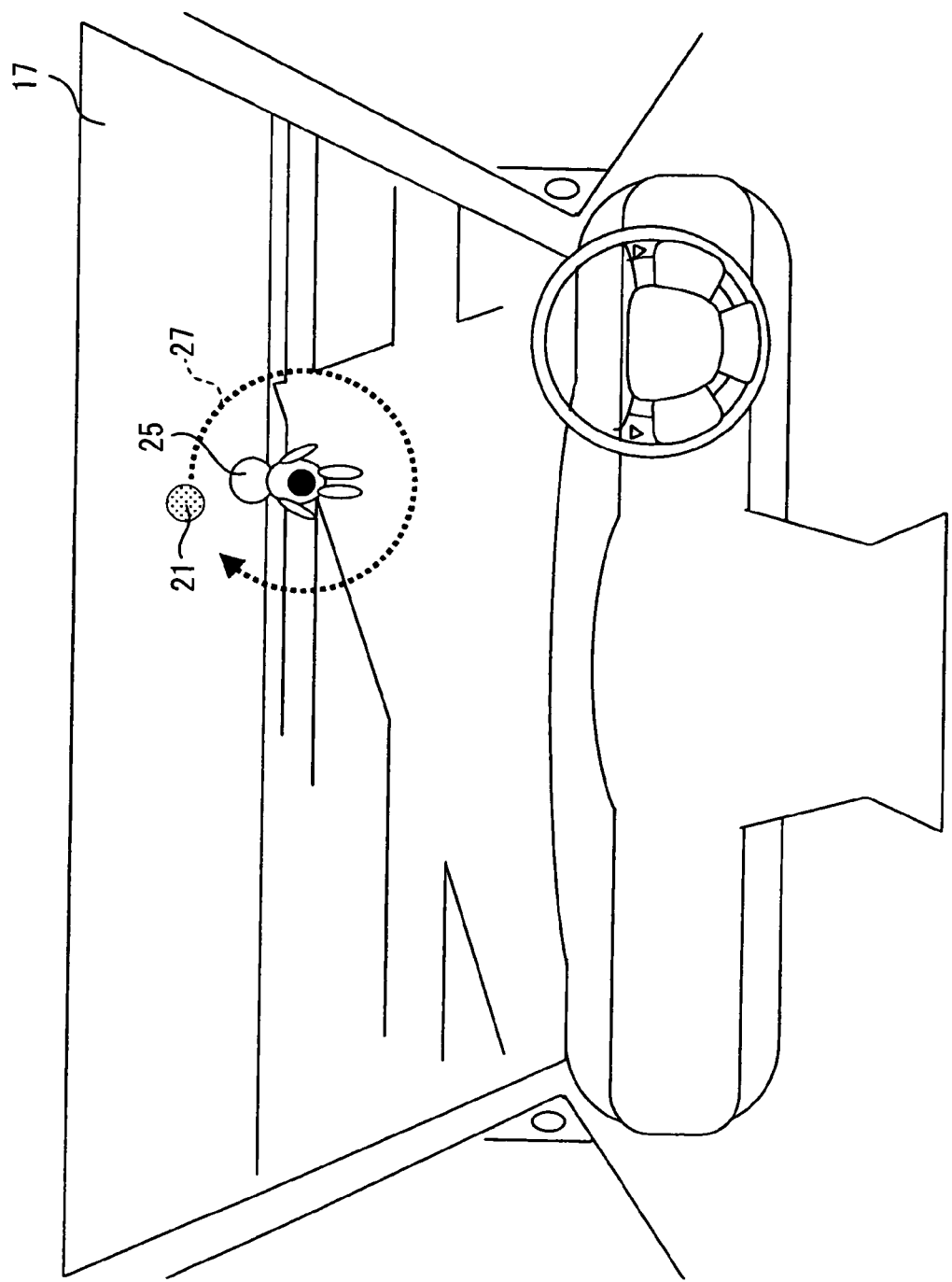
FIG. 6 is yet another illustration expressing a virtual image displayed by the display unit in a view of a driver looking a front field of the vehicle.
Figure 7:
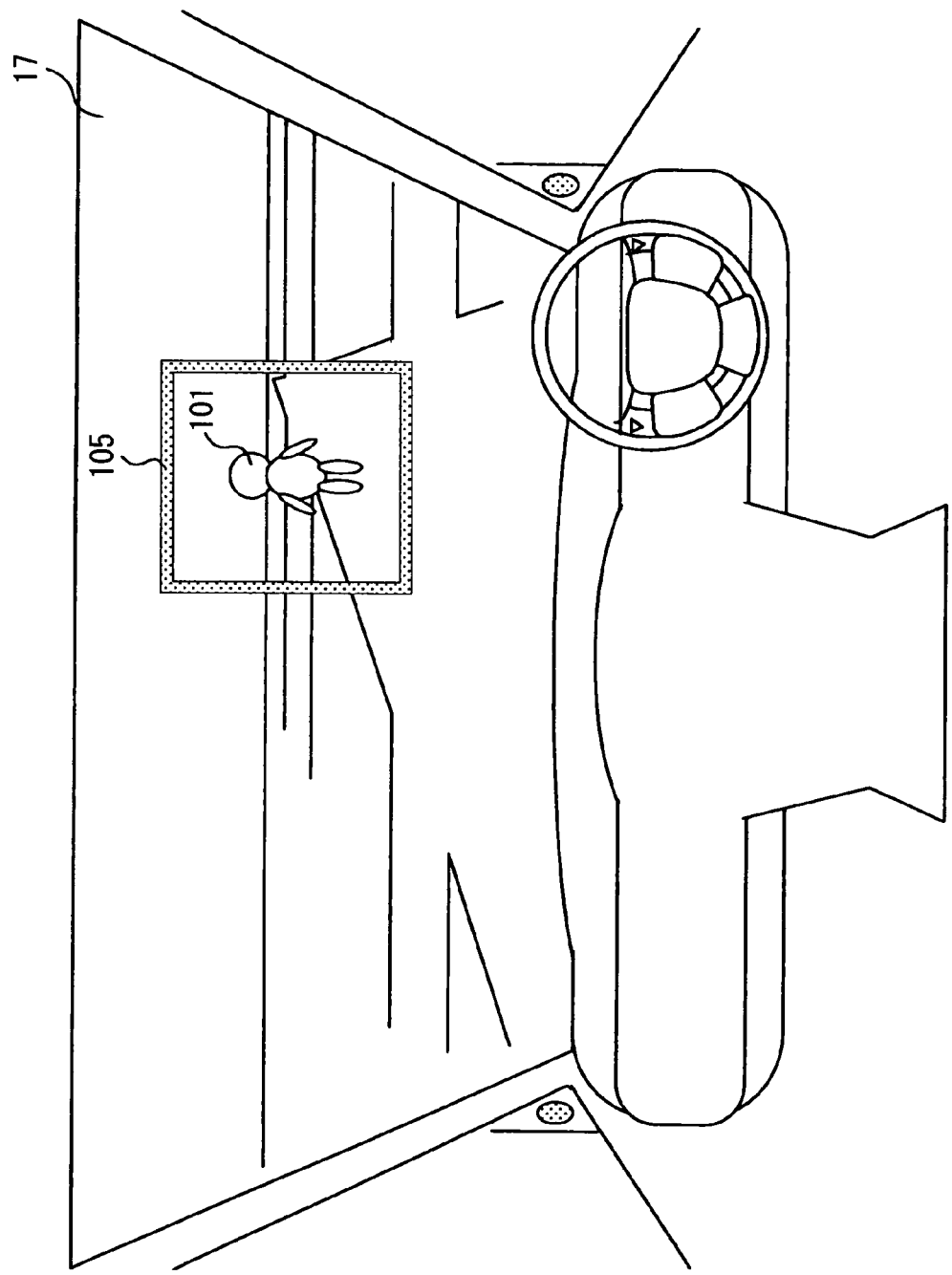
FIG. 7 is still yet another illustration expressing a virtual image displayed by the display unit in a view of a driver looking a front field of the vehicle in a prior art.
Figure 8:
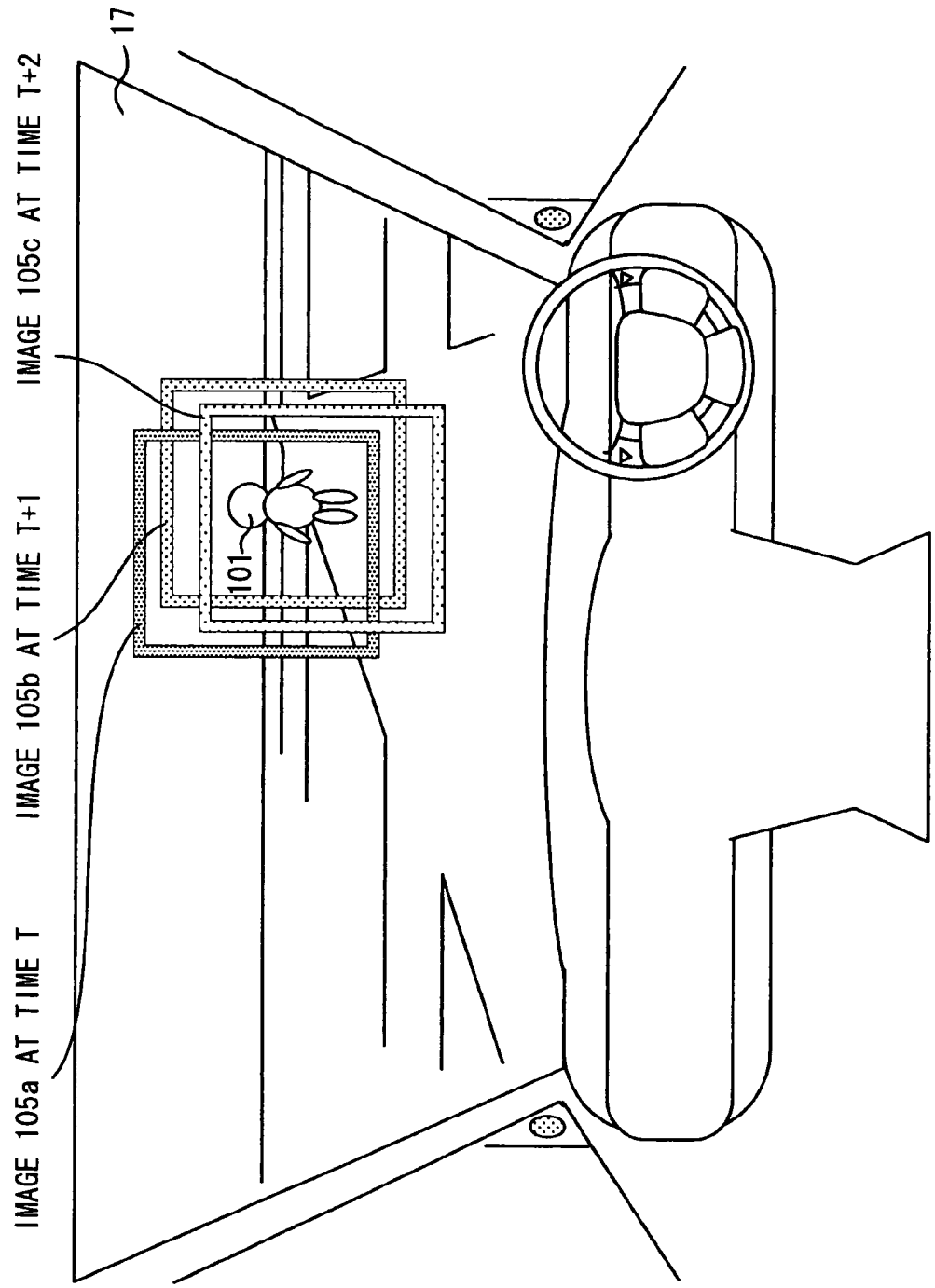
FIG. 8 is still yet another illustration expressing a virtual image displayed by the display unit in a view of a driver looking a front field of the vehicle in a prior art.

Furthermore, as shown in FIG. 6, the orbit 27 may always be a perfect circle that circles around the obstacle (i.e., the walker 25 in FIG. 6). In this case, the processing in the display unit 1 can be simplified because it is not necessary to change the shape of the orbit 27 depending on the obstacle. The radius of the perfect circle may be set to the radius R.

Such changes and modifications are to be understood as being within the scope of the present invention as defined by the appended claims.

What is claimed is:

1. A display apparatus for displaying an image in a view of a driver, the apparatus comprising:
    an image display unit for displaying a virtual image by projecting an image light in a front of a vehicle through a reflective device;
    an obstacle detector for detecting an obstacle existing around the vehicle;
    a safety determination unit for determining safety of the vehicle relative to the detected obstacle based at least on one of a distance from the obstacle and a relative speed of the vehicle relative to the obstacle; and
    an image control unit for controlling a position of the virtual image, wherein the position of the virtual image is configured to move along a path that surrounds the obstacle in a view of the driver when the obstacle is determined to be unsafe by the safety determination unit.

2. The display apparatus of claim 1, wherein
    a distance calculation unit for calculating a distance to the obstacle from the vehicle is provided in the display apparatus, and
    the path is one of a circle and an ellipse with a radius configured to increase inversely proportional to the distance to the obstacle.

3. The display apparatus of claim 1, wherein
    a size calculation unit for calculating a size of the obstacle is provided in the display apparatus, and
    the path is one of a circle and an ellipse having a radius that configured to increase proportionally to the size of the obstacle.

4. The display apparatus of claim 1, wherein
an obstacle recognition unit for determining whether the obstacle is a human as well as determining whether the obstacle is another vehicle is provided in the display apparatus, and
the path takes a different shape depending on a recognition result by the obstacle recognition unit that the obstacle is the human or another vehicle.

5. The display apparatus of claim 4, wherein
the path takes a vertically elongated ellipse shape in a view of the driver when the obstacle is the human, and
the path takes a horizontally elongated ellipse shape in a view of the driver when the obstacle is another vehicle.

6. The display apparatus of claim 1, wherein
the reflective device that reflects the image light is one of a windshield and a combiner.

7. A method for displaying an image in a view of a driver, the method comprising:
providing an image display unit for displaying a virtual image by projecting an image light in a front of a vehicle through a reflective device;
providing an obstacle detector for detecting an obstacle existing around the vehicle;
providing a safety determination unit for determining safety of the vehicle relative to the detected obstacle based at least on one of a distance from the obstacle and a relative speed of the vehicle relative to the obstacle; and
providing an image control unit for controlling a position of the virtual image, wherein the virtual image is configured to move around the obstacle in a view of the driver when the obstacle is determined to be unsafe by the safety determination unit.

* * * * *